(12) United States Patent
Wang

(10) Patent No.: US 6,178,387 B1
(45) Date of Patent: Jan. 23, 2001

(54) METHOD FOR THE DETERMINATION OF PEAKS IN A DISCRETE SIGNAL

(75) Inventor: Lizhi Wang, Cupertino, CA (US)

(73) Assignees: Sony Corporation, Tokyo (JP); Sony Electronics Inc., Park Ridge, NJ (US)

(*) Notice: Under 35 U.S.C. 154(b), the term of this patent shall be extended for 0 days.

(21) Appl. No.: 09/250,445

(22) Filed: Feb. 16, 1999

(51) Int. Cl.[7] .............................. G06F 19/00; G06K 9/42; G06K 9/44
(52) U.S. Cl. ........................ 702/66; 702/70; 702/74; 702/193; 382/256; 382/257
(58) Field of Search ................ 702/66, 67, 69, 702/70, 74, 189–191, 193; 382/256, 257

(56) References Cited

U.S. PATENT DOCUMENTS

| | | | |
|---|---|---|---|
| 4,366,544 | * 12/1982 | Shima et al. ............................ 702/56 |
| 4,731,863 | * 3/1988 | Sezan et al. ........................... 382/264 |
| 4,918,633 | * 4/1990 | Sullivan ................................ 382/275 |
| 4,952,805 | 8/1990 | Tanaka . |
| 5,619,592 | * 4/1997 | Bloomberg et al. ................. 382/257 |
| 5,751,846 | 5/1998 | Higgins-Luthman . |
| 5,757,953 | * 5/1998 | Jang ...................................... 382/257 |

* cited by examiner

*Primary Examiner*—Marc S. Hoff
*Assistant Examiner*—Bryan Bui
(74) *Attorney, Agent, or Firm*—Blakely, Sokoloff, Taylor & Zafman LLP

(57) ABSTRACT

A method of determining peaks in a discrete function. The method comprising the steps of: applying a closing function to the discrete function to generate a closed discrete function; defining peaks within the closed discrete function; sorting the defined peaks according to function value; and applying a threshold value to each sorted defined peak in individual succession, wherein sorted defined peaks having a peak height value above the threshold value are retained within the closed discrete function.

30 Claims, 10 Drawing Sheets

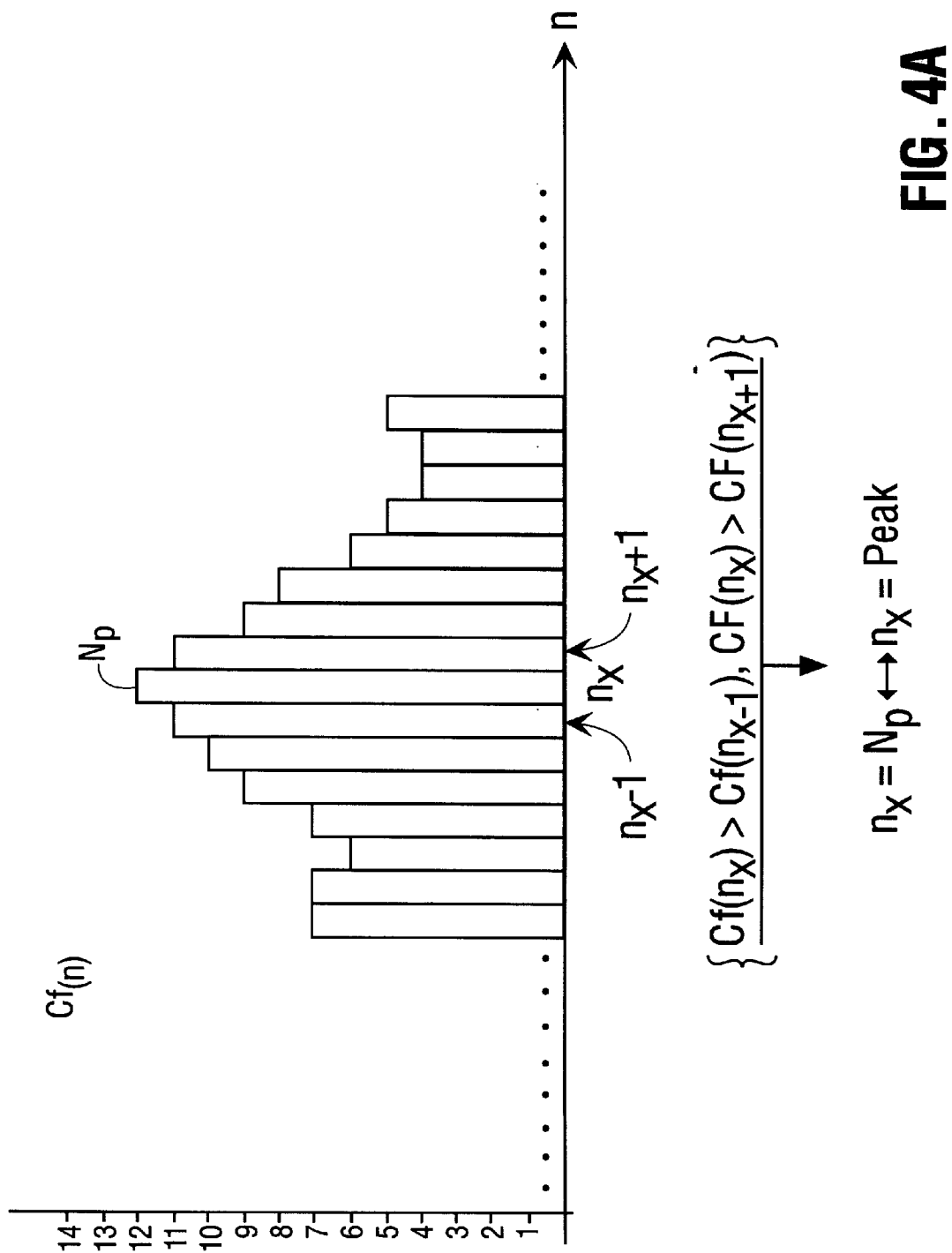

METHOD FOR THE DETERMINATION OF PEAKS IN A DISCRETE SIGNAL

FIELD OF THE INVENTION

The present invention relates to field of signal processing. More specifically, the present invention relates to a method for the determination of peaks in a discrete signal.

BACKGROUND

Discrete signals or functions, such as image histograms or discrete digital information signals, for example, are comprised of a series of discrete components or values. Each discrete component of a discrete signal represents a specific segment of data or data value associated with the discrete signal. Therefore, each discrete component contained in the discrete signal is used to convey different information or data represented within the discrete signal.

In particular, peaks or informational peaks contained within discrete signals are generally used to convey different information or types of information. For instance, the informational peaks may be used to classify a particular discrete signal as conveying a particular type of information or data. Alternately, the informational peaks themselves may convey a particular type of information or data.

In operation, however, discrete signals may become distorted due to noise interference or other interference (e.g., electrical, magnetic, spectral, etc.), which results in the distortion of the discrete signal. Such interference can result in a series of interference induced spikes, also referred to as "false peaks", being introduced into the discrete signal which are attributable to the interference. As such, the interference induced spikes or "false peaks" may convey false information or data as a result of the interference.

In such applications, such as image processing for example, the interference induced spikes or "false peaks" introduced in a representative discrete signal (e.g., image histogram) may result in the erroneous classification or processing of an image. Therefore, the interference induced spikes may convey false information regarding the type of data contained within the discrete signal.

It is therefore desirable to provide a technique for determining the valid informational peaks contained within a discrete signal from any interference induced spikes that may be introduced into, or contained in, the discrete signal.

SUMMARY OF THE INVENTION

An embodiment of the present invention provides for a method and computer readable medium for determining peaks in a discrete function. Initially, a closing function is applied to the discrete function to generate a closed discrete function. The peaks within the closed discrete function are then defined. Next, the defined peaks are sorted according to function value. Subsequently, a threshold is applied to each sorted defined peak in individual succession, wherein sorted defined peaks having a peak height value above the threshold value are retained within the closed discrete function.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 4A and 4B illustrate embodiments of random simple peaks for the purpose of illustrating an embodiment of a technique for peak classification in accordance with the teachings of one embodiment of the present invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The following detailed description discusses a discrete function f(n) in exemplary terms of an image histogram, but it is understood that the present invention is not limited to such a discrete function f(n). Rather, the inventive concepts of the present invention, as embodied in the claims, may be applied to any type of discrete function f(n) or any type of discrete signal representative of any type of data (e.g., communications data, spectral data, graphics data, and a variety of other types of data).

Figure 1:
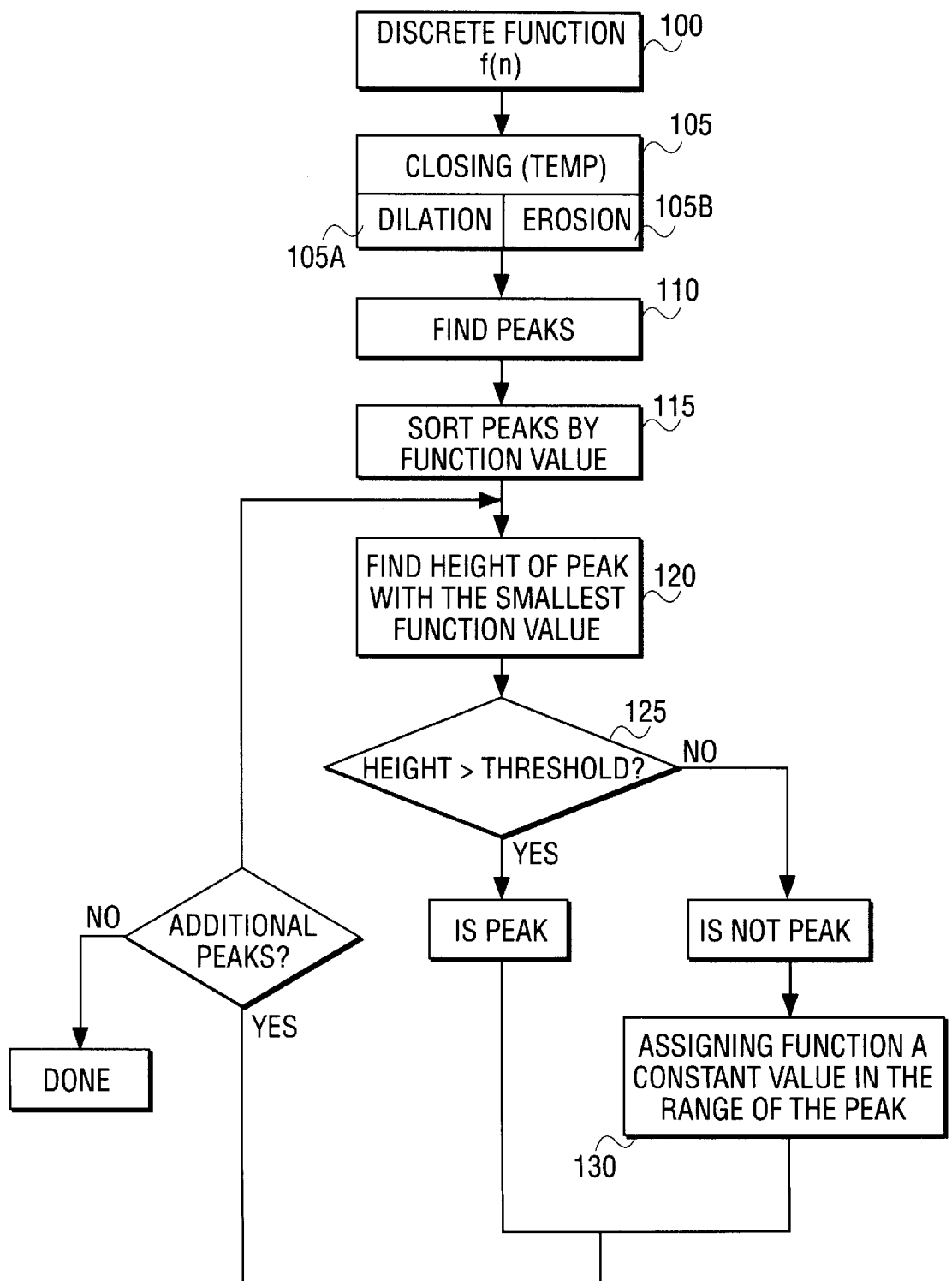
FIG. 1 illustrates a block flow diagram for an embodiment of a method for determining peaks in a discrete signal in accordance with the teachings of one embodiment of the present invention.

FIG. 1 is a block flow diagram for an embodiment of a method of determining peaks in a discrete signal implementing the teachings of the present invention. Initially at Block 100, a discrete function f(n) is received from, or otherwise generated by, a source. The discrete function f(n) comprises a series of discrete informational components (n) of differing magnitudes or function values f(n) which are representative of data or other information within the discrete function f(n).

Figure 2:
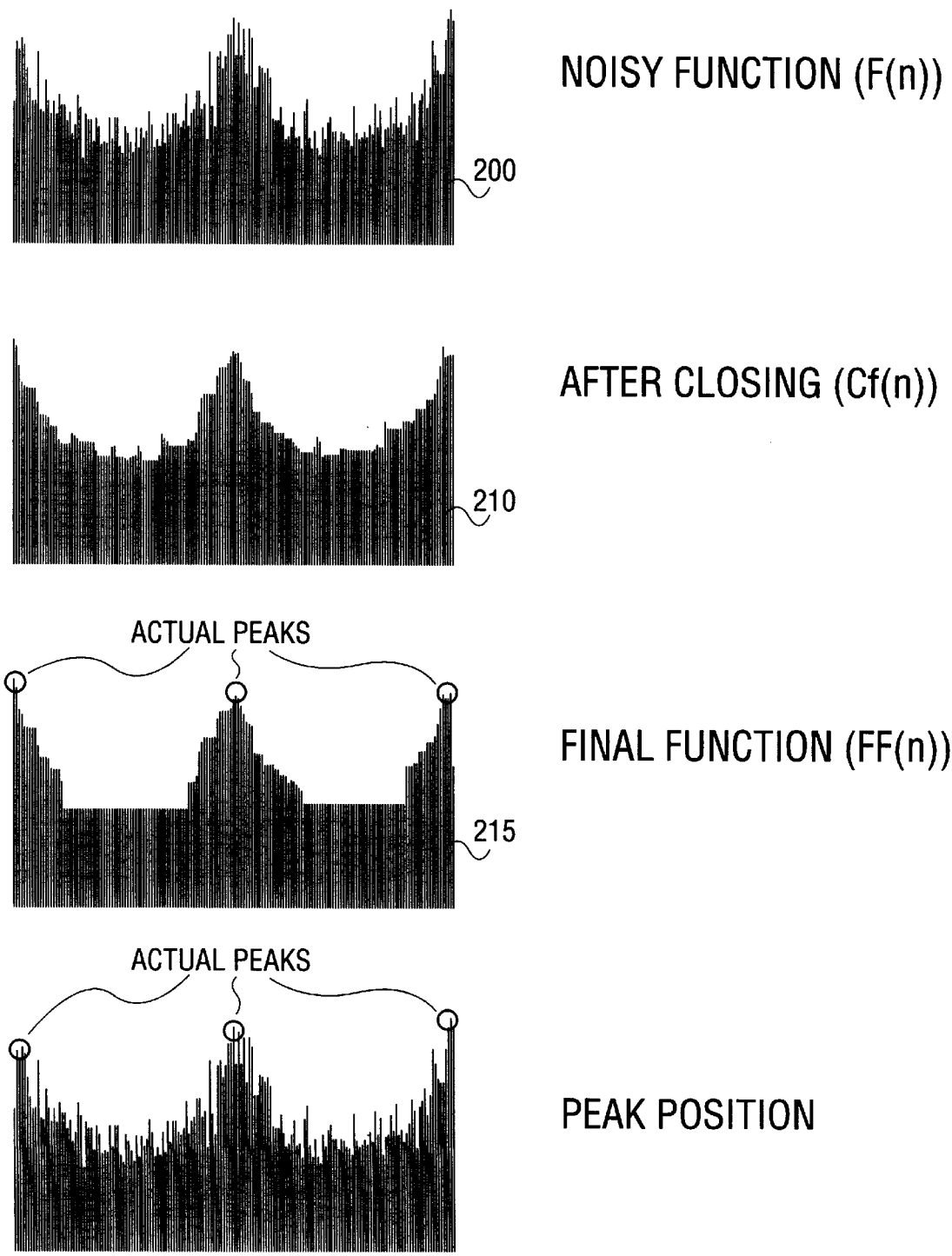
FIG. 2 illustrates embodiments of a discrete function during different processing stages of the discrete function in accordance with the teachings of one embodiment of the present invention.

FIG. 2 illustrates an embodiment of a discrete function f(n) 200, exemplary of an embodiment of a type of discrete function f(n) received at Block 100. The discrete function f(n) 200 contains a series of discrete informational components (n) of differing magnitudes or function values f(n). The discrete function f(n) 200 illustrates an example of a "noisy" discrete function f(n) that may contain a series of interference induced spikes among the discrete informational components (n) comprising the discrete function f(n) 200. The "noisy" discrete function f(n) may also be referred to as a "dirty" signal as a result of interference (e.g., interference induced spikes) being introduced to the discrete function f(n) 200. In the present embodiment, the discrete function f(n) 200 may be representative of an image histogram, however, it is understood that the image histogram is merely representative of an exemplary embodiment of one type of discrete function f(n), and as such the present invention is not limited to such a type of discrete function f(n).

Figure 3A:
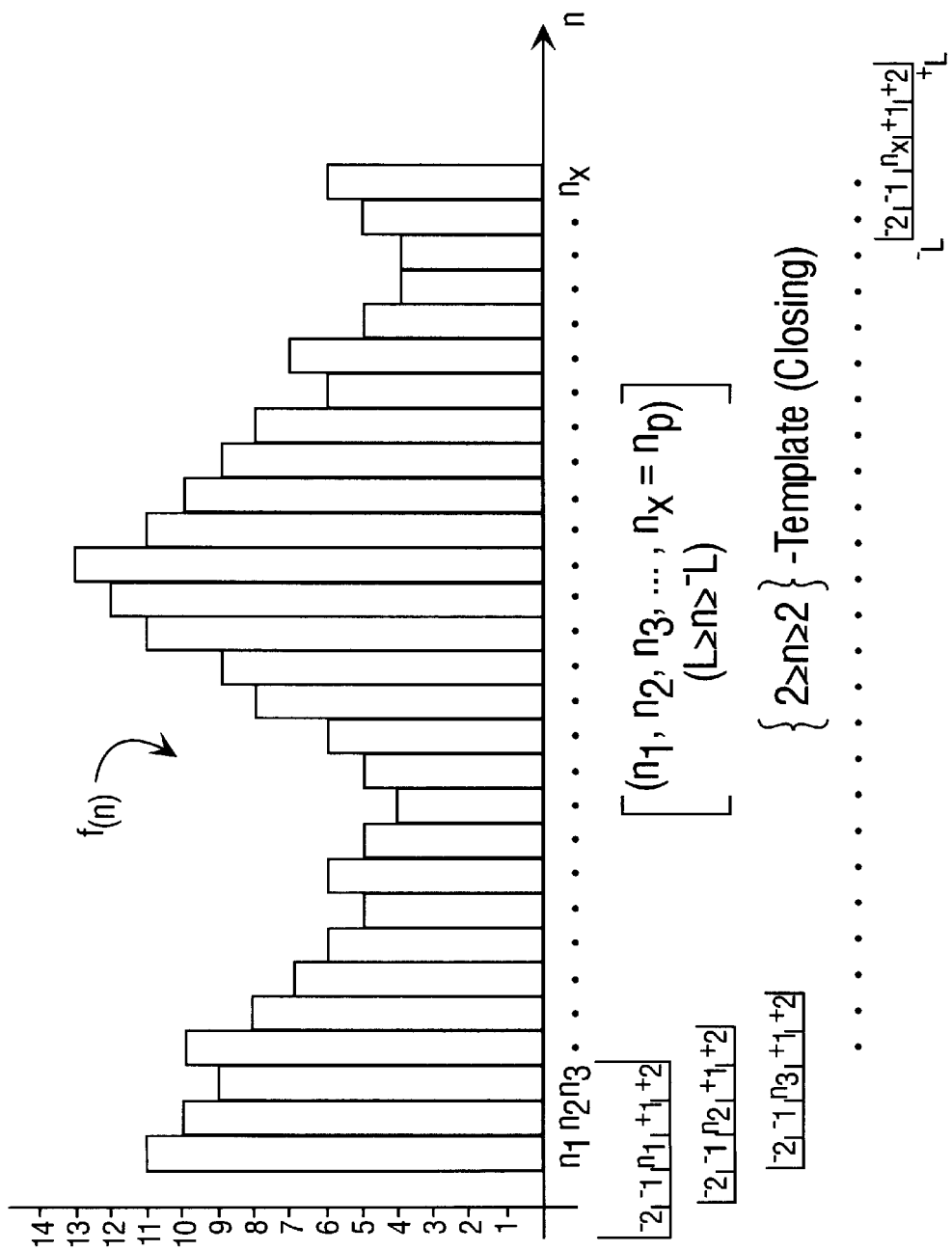
FIGS. 3A, 3B, and 3C illustrate embodiments of representative sections of a discrete function for the purpose of illustrating the application of the closing function to a discrete function in accordance with the teachings of one embodiment of the present invention.

Referring back to FIG. 1, at Block 105 a closing function (C) is applied to the discrete function f(n) resulting in the generation of a closed discrete function Cf(n). FIG. 3A illustrates an embodiment of a representative section or portion of the discrete function f(n) for the purpose of illustrating the application of the closing function (C) to the discrete function f(n).

Initially, at Block 105, a closing template ($L \geq n \geq -L$) is selected for application to the discrete function f(n). The range (L) of the closing template may be selected in accordance with a users preference or in accordance with the requirements of a desired operational application. As illustrated in the embodiment of FIG. 3A, a closing template having a range (L) of two (L=2) is selected, or ($2 \geq n \geq -2$). It is understood that any desired range (L) value may be selected for the closing template as desired. Accordingly, the closing template is applied to each discrete informational component (n) within the discrete function f(n).

Accordingly, at Block 105A, after the range (L) of the closing template is determined or otherwise selected by a user or application, a dilation function is applied to the discrete informational components (n) comprising the discrete function f(n). As illustrated by FIG. 3A, the discrete informational component ($n_x$) that is centered within the closing template, as defined by the range (L), is referred to as a primary discrete component ($n_p$).

The dilation function analyses the discrete informational components (n) contained within the closing template to determine the discrete informational component (n) having the maximum discrete component function value $f(n_{max})$ within the closing template ($L \geq n \geq -L$) as defined by the associated range (L). Accordingly, as illustrated In FIG. 3A, for each discrete informational component (n) within the closing template ($L \geq n \geq -L$), the maximum discrete component function value $f(n_{max})$ contained in the closing template is output as the function value of the primary discrete component ($n_p$). This process is repeated for each of the discrete informational components (n) contained in the discrete function f(n), as illustrated by FIG. 3A. As a result of the application of the dilation function to the discrete function f(n) a dilated discrete function Df(n) is produced, as illustrated in FIG. 3B.

Figure 3B:
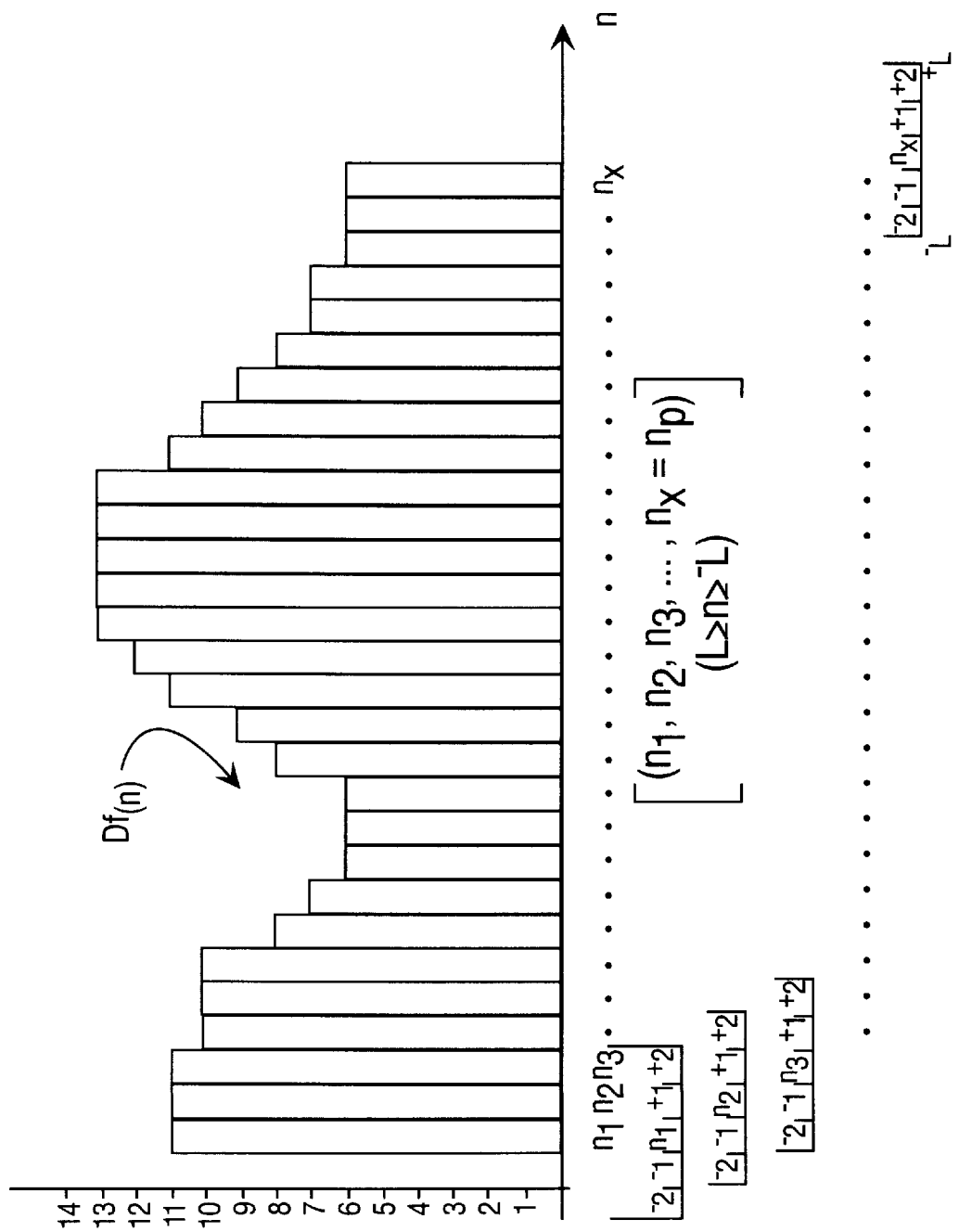

At Block 105B, after the dilation function has been applied to the discrete function f(n), thereby producing the dilated discrete function Df(n) of FIG. 3B, an erosion function is applied to the dilated discrete function Df(n). As illustrated by FIG. 3B, the discrete informational component (n) that is centered within the closing template, as defined by the range (L), is referred to as the primary discrete component ($n_p$).

Figure 3C:
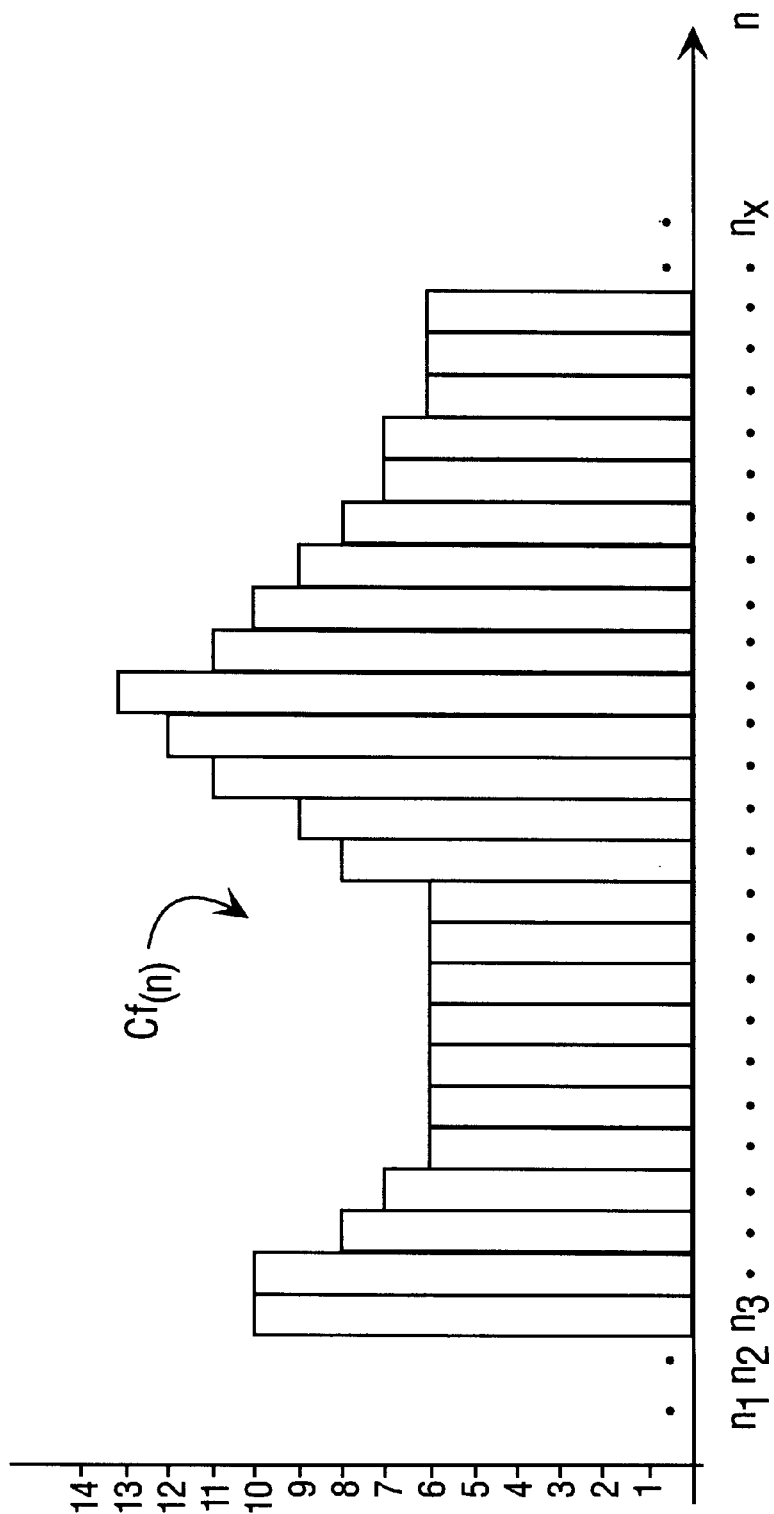

The erosion function analyses the discrete informational components (n) contained within the closing template to determine the discrete informational component (n) having the minimum discrete component function value $f(n_{min})$ within the closing template ($L \geq n \geq -L$) as defined by the associated range (L). Accordingly, as illustrated In FIG. 3B, for each discrete informational component (n) within the closing template, the minimum discrete component function value $f(n_{min})$ contained in the closing template is output as the function value of the primary discrete component ($n_p$). This process is repeated for each of the discrete informational components (n) contained in the dilated discrete function Df(n), as illustrated by FIG. 3B. As a result of the application of the erosion function to the dilated discrete function Df(n) a closed discrete function Cf(n) is produced, as illustrated in FIG. 3C.

Similarly, FIG. 2 illustrates the resultant closed discrete function Cf(n) 210 which is produced from the application of a dilation and erosion function to the discrete function f(n) 200.

Referring again to FIG. 1, at Block 110 any peaks contained in the closed discrete function Cf(n) are defined or otherwise determined. As such, a peak is determined within the closed discrete function Cf(n) based upon the magnitude or function value f(n) associated with the discrete components (n) located adjacent to each individual discrete component (n) contained within the closed discrete function Cf(n).

FIG. 4A illustrates an example of a simple peak similar to one that may be contained within any closed discrete function Cf(n). Accordingly, for each discrete component ($n_x$) contained in closed discrete function Cf(n), the function values of the adjacent discrete components located at ($n_x-1$) and ($n_x+1$), which are Cf($n_x-1$) and Cf($n_x+1$), are compared against the function value of the discrete component ($n_x$), which is Cf($n_x$), wherein the discrete component ($n_x$) is located between the adjacent discrete components located at ($n_x-1$) and ($n_x+1$). Accordingly, provided the function value of the discrete component ($n_x$), located between the adjacent discrete components located at ($n_x-1$) and ($n_x+1$), is greater than the function value of the adjacent discrete components located at ($n_x-1$) and ($n_x+1$), or Cf($n_x$)>Cf($n_x-1$) and Cf($n_x$)>Cf($n_x+1$), the discrete component ($n_x$), located between the adjacent discrete components located at ($n_x-1$) and ($n_x+1$), is classified as a peak ($N_P$).

Figure 4B:
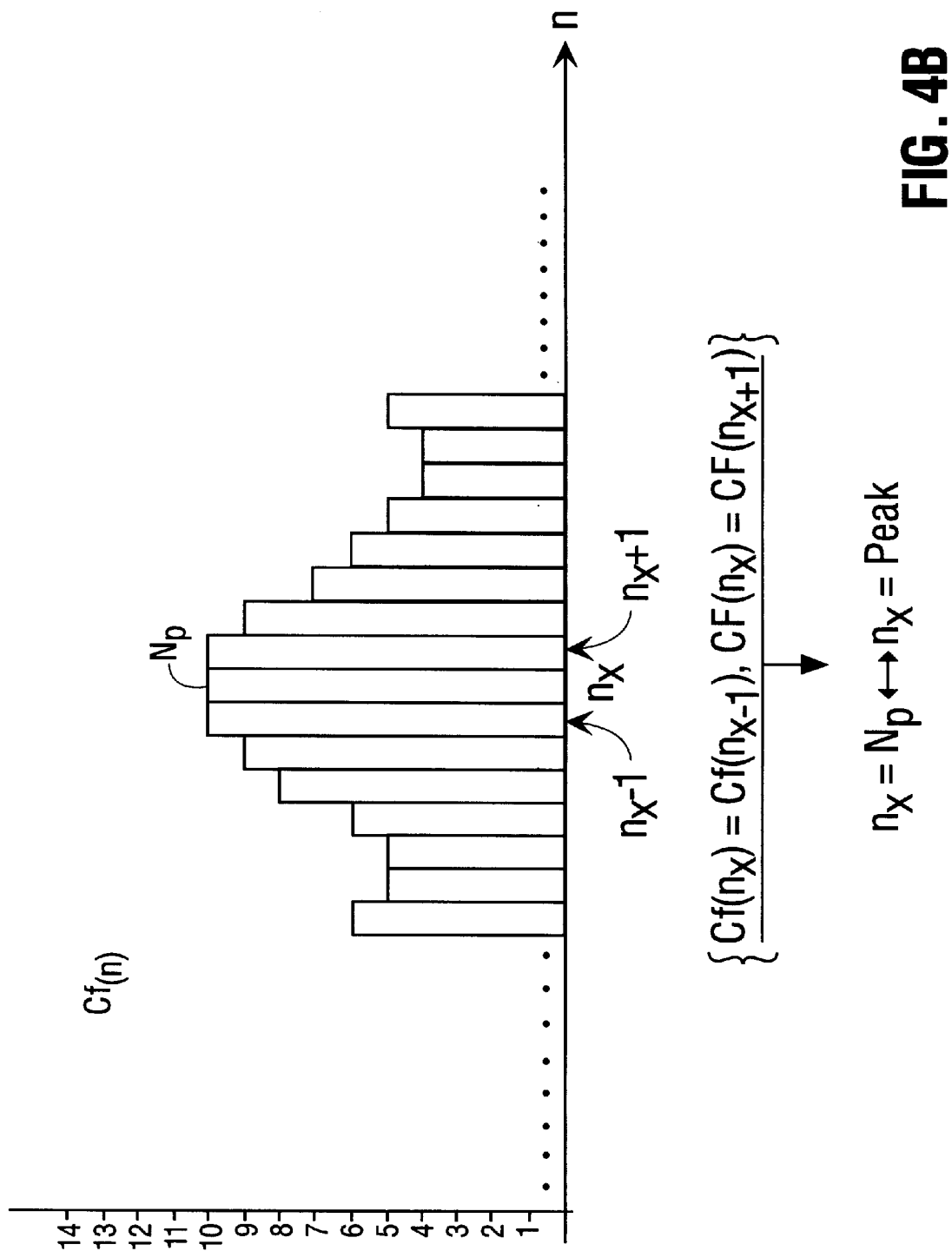

In the event that that the function value of the discrete component ($n_x$), Cf($n_x$), located between the adjacent discrete components located at ($n_x-1$) and ($n_x+1$), is equal to the function value the adjacent discrete components located at ($n_x-1$) and ($n_x+1$), or Cf($n_x$)=Cf($n_x-1$) and Cf($n_x$)=Cf($n_x+1$), wherein the function value of the closed discrete function Cf(n) is flat within the range defined by the adjacent discrete components located at ($n_x-1$) and ($n_x+1$), as illustrated in FIG. 4B, the discrete component ($n_x$), located between the adjacent discrete components located at ($n_x-1$) and ($n_x+1$), may be classified as a peak ($N_P$).

At Block 115, each of the discrete components (n), contained in the closed discrete function Cf(n), which are classified as peaks ($N_P$) are sorted by their respective function values or magnitudes f($N_P$). In one embodiment, the respective function values or magnitudes f($N_P$) associated with each peak ($N_P$) are categorized or ordered into a listing of peaks or a peak stack, wherein the peaks ($N_P$) having the smaller function values f($N_P$) are placed at the beginning of the peak stack followed by subsequent peaks ($N_P$) that increase in function values f($N_P$). As such, the peaks ($N_P$) are in an ordered listing based upon their respective function values f($N_P$). In one embodiment, the peak stack may be stored in a temporary buffer or other memory device.

Next, at Block 120, the height (h) of the first peak ($N_{P1}$) contained in the peak stack is determined, correspondingly the first peak ($N_{P1}$) has the smallest function value f($N_{P1}$) as compared to the subsequent peaks ($N_P$) contained in the peak stack. The height (h) of each peak ($N_{Px}$) contained in the peak stack is determined based upon the respective peak boundaries (Left Boundary [LB] and Right Boundary [RB]) associated with each peak ($N_{Px}$).

Figure 5:
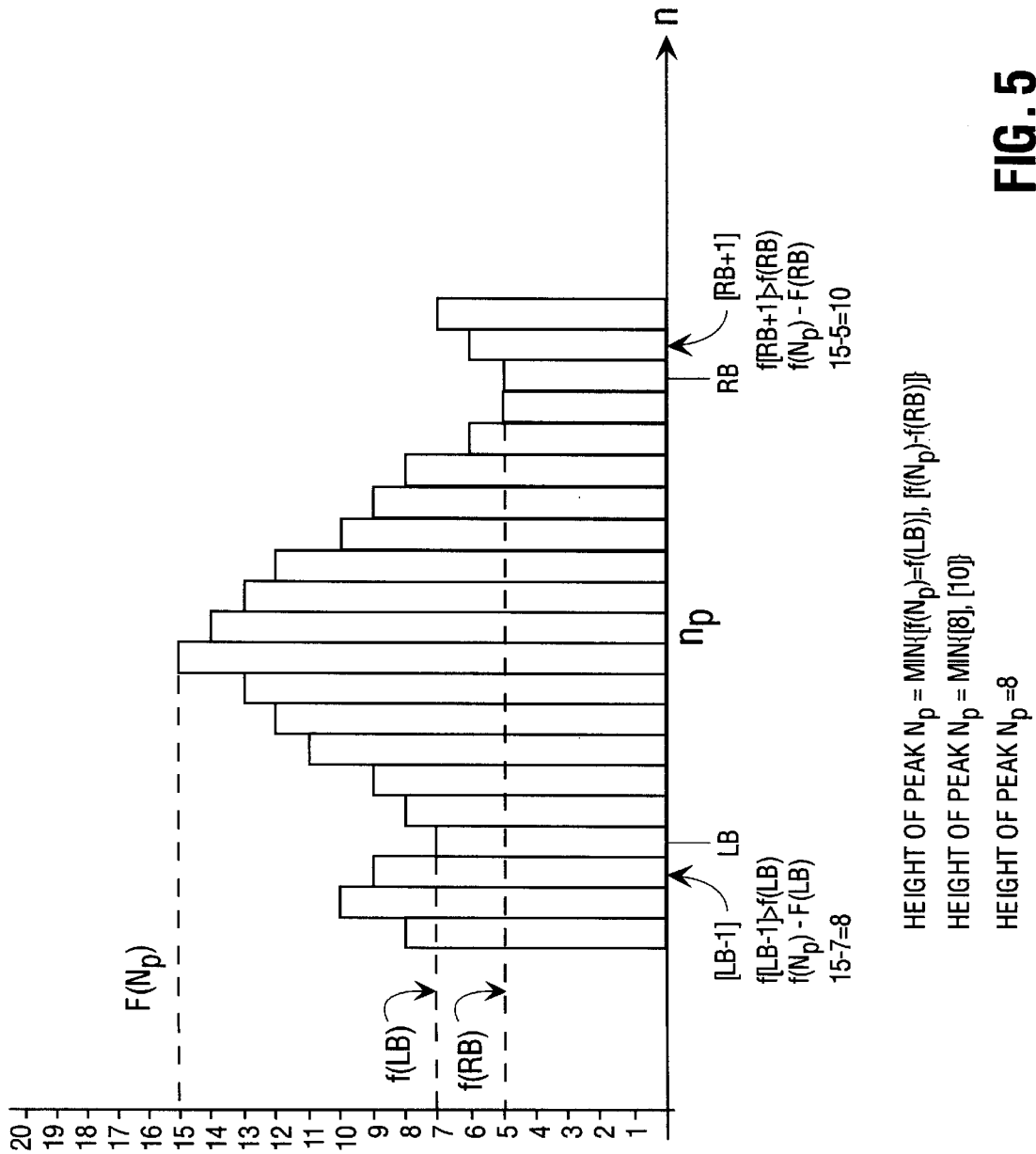
FIG. 5 illustrates an embodiment of a peak for the purpose of illustrating an embodiment of a technique for determining peak boundaries and height(s) associated with a peak in accordance with the teachings of one embodiment of the present invention.

FIG. 5 illustrates an exemplary peak ($N_P$) which is used to illustrate one embodiment of a technique that may be used to determine the respective peak boundaries (Left Boundary [LB] and Right Boundary [RB]) associated with each peak ($N_P$), as well as the height (h) of each peak ($N_P$). By definition, the function value $f(N_P)$ of the peak ($N_P$) is going to have a greater magnitude or function value $f(N_P)$ as compared to the function value of the Left Boundary $f([LB])$ of the peak ($N_P$), or $f(N_P)>f([LB])$. Similarly, the function value $f(N_P)$ of the peak ($N_P$) is going to have a greater magnitude or function value $f(N_P)$ as compared to the function value of the Right Boundary $f([RB])$ of the peak ($N_P$), or $f(N_P)>f([RB])$.

Accordingly, the Left Boundary [LB] of each peak ($N_P$) is established by analyzing the function values f(n) of the discrete components adjacent to and to the left of the peak (NP) within the closed discrete function Cf(n). The Left Boundary [LB] of each peak ($N_P$) is established when the function value f(n) of the next subsequent discrete component (n), proceeding leftward from the peak ($N_P$), exceeds the function value f(n) of the preceding discrete component (n). Therefore, as illustrated in FIG. 5, the Left Boundary [LB] of the peak ($N_P$) is established provided the function value f(n) of the discrete component to the left [f(LB−1)] of the Left Boundary [LB] is greater than the function value of the Left Boundary f[LB], or $f([LB-1])>f([LB])$ when (n) is in (LB, $N_P$).

Similarly, the Right Boundary [RB] of each peak ($N_P$) is established by analyzing the function values f(n) of the discrete components adjacent to and to the right of the peak ($N_P$) within the closed discrete function Cf(n). The Right Boundary [RB] of each peak ($N_P$) is established when the function value f(n) of the next subsequent discrete component (n), proceeding rightward from the peak ($N_P$), exceeds the function value f(n) of the preceding discrete component (n). Therefore, as illustrated in FIG. 5, the Right Boundary [RB] of the peak ($N_P$) is established provided the function value f(n) of the discrete component to the right [(RB−1)] of the Right Boundary [RB] is greater than the function value of the Right Boundary [RB], or $f([RB+1])>f([RB])$ when (n) is in ($N_P$, RB).

The height (h) of a peak ($N_P$), as illustrated in FIG. 5, is determined by taking the minimum value of either (1) [{function value of the peak $f(N_P)$}−{function value of the Left Boundary $f([LB]$}] or (2) [{function value of the peak $f(N_P)$}−{function value of the Right Boundary $f([RB]$}], or expressed alternately, min $\{f(N_P)-f([LB]), f(N_P)-f([RB])\}$.

At Block 125, the associated height value (h) for the first peak ($N_{P1}$) contained in the peak stack is compared against a definable threshold value (T). The definable threshold value (T) may be selected in accordance with a users preference or in accordance with the requirements of a desired operational application.

Accordingly, provided the associated height value (h) of the first peak ($N_{P1}$) is greater than or equal to the definable threshold value (T), the first peak ($N_{P1}$) is classified as an actual peak (i.e., valid peak) and retained within the closed discrete function Cf(n) as an actual peak. As such, each peak ($N_P$) classified as an actual peak ($N_P$) is maintained within the closed discrete function Cf(n).

Alternately, provided the associated height value (h) of the first peak ($N_{P1}$) is less than the definable threshold value (T), the peak ($N_{P1}$) would be classified as a non-peak. Accordingly, at Block 130, the discrete components (n) located between the respective peak boundaries (Left Boundary [LB] and Right Boundary [RB]) are assigned a constant value based upon respective peak boundaries (Left Boundary [LB] and Right Boundary [RB]) associated with the non-peak. Therefore, the discrete components (n) located between the respective peak boundaries (Left Boundary [LB] and Right Boundary [RB]) are assigned the minimum function value associated with the boundaries (Left Boundary [LB] and Right Boundary [RB]), wherein the non-peak is located between the respective Left Boundary [LB] and Right Boundary [RB], or expressed alternately, the discrete components (n) located between the respective peak boundaries are assigned to the min $\{f([LB]), f([RB])\}$, wherein the non-peak ($N_{P1}$) is in [LB, RB]. Therefore, the non-peaks are effectively removed from the closed discrete function Cf(n) by setting the discrete components (n) located between the respective peak boundaries to a constant value determined by the minimum function value f(n), min $\{f([LB]), f([RB])\}$, associated with the respective peak boundaries (Left Boundary [LB] and Right Boundary [RB]) associated with a particular peak ($N_{Px}$).

Accordingly, after the first peak ($N_{P1}$) has been fully processed in accordance with either Step 125 or Step 130, as illustrated above, the process returns to Step 120, wherein the second peak ($N_{P2}$) contained in the peak stack is processed. Similarly, the height of the second peak ($N_{P2}$), wherein the second peak ($N_{P2}$) has as a greater function value or magnitude $f(N_{P2})$ as compared to the function value of the previously processed peak ($N_{P1}$), is determined in accordance with the technique illustrated in FIG. 5. Accordingly, at Block 125, the associated height value (h) for the second peak ($N_{P2}$) contained in the peak list is compared against a definable threshold value (T).

Correspondingly, provided the associated height value (h) of the second peak ($N_{P2}$) is greater than or equal to the definable threshold value (T), the second peak ($N_{P2}$) is classified as an actual peak (i.e., valid peak) and retained within the closed discrete function Cf(n) as an actual peak. As such, each peak ($N_P$) classified as an actual peak ($N_P$) is maintained within the closed discrete function Cf(n).

Alternately, provided the associated height value (h) of the second peak ($N_{P2}$) is less than the definable threshold value (T), the peak ($N_{P2}$) would be classified as a non-peak. Accordingly, at Block 130, the discrete components (n) located between the respective peak boundaries (Left Boundary [LB] and Right Boundary [RB]) are assigned a constant value based upon respective peak boundaries (Left Boundary [LB] and Right Boundary [RB]) associated with the non-peak. Therefore, the discrete components (n) located between the respective peak boundaries (Left Boundary [LB] and Right Boundary [RB]) are assigned the minimum function value associated with the boundaries (Left Boundary [LB] and Right Boundary [RB]), wherein the non-peak is located between the respective Left Boundary [LB] and Right Boundary [RB], or expressed alternately, the discrete components (n) located between the respective peak boundaries are assigned to the min $\{f([LB]), f([RB])\}$, wherein non-peak ($N_{P2}$) is in [LB, RB]. Therefore, the non-peaks are effectively removed from the closed discrete function Cf(n) by setting the discrete components (n) located between the respective peak boundaries to a constant value determined by the minimum function value f(n), min $\{f([LB]), f([RB])\}$, associated with the respective peak boundaries (Left Boundary [LB] and Right Boundary [RB]) associated with a particular peak ($N_{Px}$).

Accordingly, as illustrated in FIG. 1, this process is carried out for each peak ($N_{Px}$) contained in the peak stack until all the peaks ($N_{P1}$, $N_{P2}$, ..., $N_{Px-1}$, $N_{Px}$) contained in the peak stack have been processed. Therefore, each peak ($N_{Px}$) contained in the peak stack is processed in individual succession, so that each peak ($N_{Px}$) is fully processed before proceeding onto the next subsequent peak ($N_{Px}$) in the peak stack. As such, the first peak (e.g., $N_{P1}$) in the peak stack is fully processed before proceeding to process the next subsequent peak (e.g., $N_{P2}$) in the peak stack. This process is carried out for each peak ($N_{Px}$) contained in the peak stack until all the peaks ($N_{P1}$, $N_{P2}$, ..., $N_{Px-1}$, $N_{Px}$) contained in the peak stack have been processed.

As a result of the threshold comparisons at Block 125, and the assignments at Block 130, the actual peaks are retained within the closed discrete function Cf(n) and the non-peaks are effectively removed from the closed function, resulting in the generation of the final discrete function Ff(n) 225. As such, peaks ($N_{Px}$) satisfying the definable threshold value (T) (i.e., height value (h) for a peak ($N_{Px}$)$\geq$T) are maintained in the closed discrete function Cf(n), and peaks ($N_{Px}$) not satisfying the definable threshold value (T) (i.e., height value (h) for a peak ($N_{Px}$)<T) are effectively removed from the closed discrete function Cf(n), resulting in the generation of the final discrete function Ff(n) 225.

Therefore, the actual peaks contained in the closed discrete function Cf(n), after processing all the peaks (NPx) in the peak stack, are the valid or actual peaks of the original discrete function f(n) 200. FIG. 2 illustrates the peak position of the valid peaks embodied in the original discrete function f(n) 200.

Figure 6:
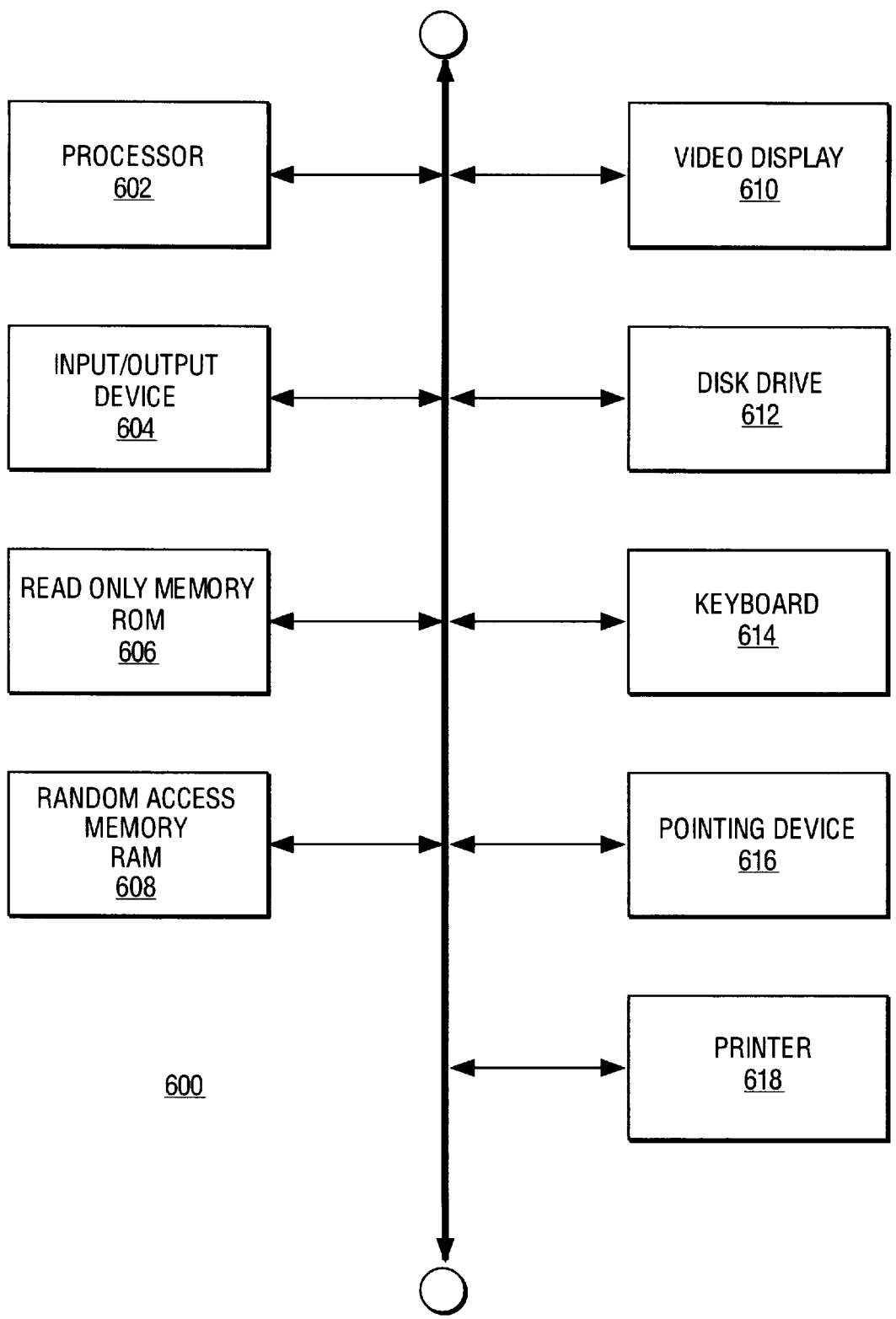
FIG. 6 illustrates an embodiment of a computer system that can be used with the present invention in accordance with the teachings of one embodiment of the present invention.

FIG. 6 illustrates an embodiment of a computer system that can be used with the present invention. The various components shown in FIG. 6 are provided by way of example. Certain components of the computer in FIG. 6 can be deleted from the addressing system for a particular implementation of the invention. The computer shown in FIG. 6 may be any type of computer including a general purpose computer.

FIG. 6 illustrates a system bus 600 to which various components are coupled. A processor 602 performs the processing tasks required by the computer. Processor 602 may be any type of processing device capable of implementing the steps necessary to perform the addressing and delivery operations discussed above. An input/output (I/O) device 604 is coupled to bus 600 and provides a mechanism for communicating with other devices coupled to the computer. A read-only memory (ROM) 606 and a random access memory (RAM) 608 are coupled to bus 600 and provide a storage mechanism for various data and information used by the computer. Although ROM 606 and RAM 608 are shown coupled to bus 600, in alternate embodiments, ROM 606 and RAM 608 are coupled directly to processor 602 or coupled to a dedicated memory bus (not shown).

A video display 610 is coupled to bus 600 and displays various information and data to the user of the computer. A disk drive 612 is coupled to bus 600 and provides for the long-term mass storage of information. Disk drive 612 may be used to store various profile data sets and other data generated by and used by the addressing and delivery system. A keyboard 614 and pointing device 616 are also coupled to bus 600 and provide mechanisms for entering information and commands to the computer. A printer 618 is coupled to bus 600 and is capable of creating a hard-copy of information generated by or used by the computer.

Figure 7:
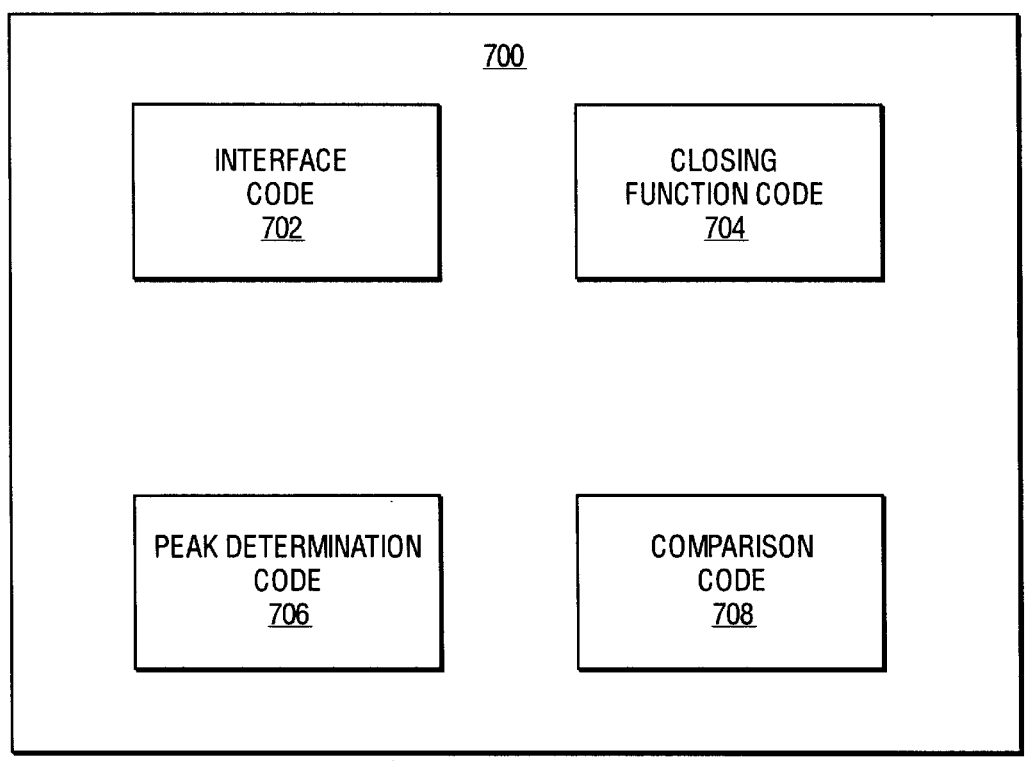
FIG. 7 illustrates an embodiment of a computer-readable medium containing various sets of instructions, code sequences, configuration information, and other data used by a computer or other processing device in accordance with the teachings of one embodiment of the present invention.

FIG. 7 illustrates an embodiment of a computer-readable medium 700 containing various sets of instructions, code sequences, configuration information, and other data used by a computer or other processing device. The embodiment illustrated in FIG. 7 is suitable for use with the peak determination method described above. The various information stored on medium 700 is used to perform various data processing operations. Computer-readable medium 700 is also referred to as a processor-readable medium. Computer-readable medium 700 can be any type of magnetic, optical, or electrical storage medium including a diskette, magnetic tape, CD-ROM, memory device, or other storage medium.

Computer-readable medium 700 includes interface code 702 that controls the flow of information between various devices or components in the computer system. Interface code 702 may control the transfer of information within a device (e.g., between the processor and a memory device), or between an input/output port and a storage device. Additionally, interface code 702 may control the transfer of information from one device to another.

Computer-readable medium 700 also includes closing function code 704 that is applied to a received discrete function f(n). The received discrete function f(n) comprises a series of discrete informational components (n) of differing magnitudes or function values f(n) which are representative of data or other information within the discrete function f(n).

Accordingly, the closing function code 704 applies a closing template (L$\geq$n$\geq$-L) to the discrete function f(n). The range (L) of the closing template may be selected in accordance with a users preference or in accordance with the requirements of a desired operational application. Accordingly, the closing template is applied to each discrete informational component (n) within the discrete function f(n).

Accordingly, after the range (L) of the closing template is determined or otherwise selected by a user or application, a dilation function is applied, by the closing function code 704, to the discrete informational components (n) comprising the discrete function f(n). The discrete informational component (n) that is centered within the closing template, as defined by the range (L), is referred to as a primary discrete component ($n_p$).

The dilation function analyses the discrete informational components (n) contained within the closing template to determine the discrete informational component (n) having the maximum discrete component function value f($n_{max}$) within the closing template (L$\geq$n$\geq$-L) as defined by the associated range (L). Accordingly, for each discrete informational component (n) within the closing template (L$\geq$n$\geq$-L), the maximum discrete component function value f($n_{max}$) contained in the closing template is output as the function value of the primary discrete component ($n_p$). This process is repeated for each of the discrete informational components (n) contained in the discrete function f(n). As a result of the application of the dilation function to the discrete function f(n) a dilated discrete function Df(n) is produced.

After the dilation function has been applied to the discrete function f(n), thereby producing a dilated discrete function Df(n), the closing function code 704 applies an erosion function to the dilated discrete function Df(n). Similarly, the discrete informational component (n) that is centered within the closing template, as defined by the range (L), is referred to as the primary discrete component ($n_p$).

The erosion function analyses the discrete informational components (n) contained within the closing template to determine the discrete informational component (n) having the minimum discrete component function value $f(n_{min})$ within the closing template $(L \geq n \geq -L)$ as defined by the associated range (L). Accordingly, for each discrete informational component (n) within the closing template, the minimum discrete component function value $f(n_{min})$ contained in the closing template is output as the function value of the primary discrete component $(n_p)$. This process is repeated for each of the discrete informational components (n) contained in the dilated discrete function Df(n). As a result of the application of the erosion function to the dilated discrete function Df(n) a closed discrete function Cf(n) is produced.

Any peaks contained in the closed discrete function Cf(n) are defined or otherwise determined by peak determination code 706. As such, a peak is determined within the closed discrete function Cf(n) based upon the magnitude or function value f(n) associated with the discrete components (n) located adjacent to each individual discrete component (n) within the closed discrete function Cf(n).

Accordingly, for each discrete component $(n_x)$ contained in closed discrete function Cf(n), the function values of the adjacent discrete components located at $(n_x-1)$ and $(n_x+1)$, which are $Cf(n_x-1)$ and $Cf(n_x+1)$, are compared against the function value of the discrete component $(n_x)$, which is $Cf(n_x)$, wherein the discrete component $(n_x)$ is located between the adjacent discrete components located at $(n_x-1)$ and $(n_x+1)$. Accordingly, provided the function value of the discrete component $(n_x)$, located between the adjacent discrete components located at $(n_x-1)$ and $(n_x+1)$, is greater than the function value of the adjacent discrete components located at $(n_x-1)$ and $(n_x+1)$, or $Cf(n_x)>Cf(n_x-1)$ and $Cf(n_x)>Cf(n_x+1)$, the discrete component $(n_x)$, located between the adjacent discrete components located at $(n_x-1)$ and $(n_x+1)$, is classified as a peak $(N_P)$.

In the event that that the function value of the discrete component $(n_x)$, $Cf(n_x)$, located between the adjacent discrete components located at $(n_x-1)$ and $(n_x+1)$, is equal to the function value the adjacent discrete components located at $(n_x-1)$ and $(n_x+1)$, or $Cf(n_x)=Cf(n_x-1)$ and $Cf(n_x)=Cf(n_x+1)$, wherein the function value of the closed discrete function Cf(n) is flat within the range defined by the adjacent discrete components located at $(n_x-1)$ and $(n_x+1)$, the discrete component $(n_x)$, located between the adjacent discrete components located at $(n_x-1)$ and $(n_x+1)$, may be classified as a peak $(N_P)$.

Each of the discrete components (n), contained in the closed discrete function Cf(n), which are classified as peaks $(N_P)$ are sorted by their respective function values or magnitudes $f(N_P)$ by peak determination code 706. In one embodiment, the respective function values or magnitudes $f(N_P)$ associated with each peak $(N_P)$ are categorized or ordered into a listing of peaks or a peak stack, wherein the peaks $(N_P)$ having the smaller function values $f(N_P)$ are placed at the beginning of the peak stack followed by subsequent peaks $(N_P)$ that increase in function values $f(N_P)$. As such, the peaks $(N_P)$ are in an ordered listing based upon their respective function values $f(N_P)$. In one embodiment, the peak stack may be stored in a temporary buffer or other memory device.

Next, the height (h) of the first peak $(N_{P1})$ contained in the peak stack is determined by determination code 706. Correspondingly, the first peak $(N_{P1})$ has the smallest function value $f(N_{P1})$ as compared to the subsequent peaks $(N_P)$ contained in the peak stack. The height (h) of each peak $(N_{Px})$ contained in the peak stack is determined based upon the respective peak boundaries (Left Boundary [LB] and Right Boundary [RB]) associated with each peak $(N_{Px})$.

By definition, the function value $f(N_P)$ of the peak $(N_P)$ is going to have a greater magnitude or function value $f(N_P)$ as compared to the function value of the Left Boundary f([LB]) of the peak $(N_P)$, or $f(N_P)>f([LB])$. Similarly, the function value $f(N_P)$ of the peak $(N_P)$ is going to have a greater magnitude or function value $f(N_P)$ as compared to the function value of the Right Boundary f([RB]) of the peak $(N_P)$, or $f(N_P)>f([RB])$.

Accordingly, the Left Boundary [LB] of each peak $(N_P)$ is established by analyzing the function values f(n) of the discrete components adjacent to and to the left of the peak $(N_P)$ within the closed discrete function Cf(n). The Left Boundary [LB] of each peak $(N_P)$ is established when the function value f(n) of the next subsequent discrete component (n), proceeding leftward from the peak $(N_P)$, exceeds the function value f(n) of the preceding discrete component (n). Therefore, the Left Boundary [LB] of the peak $(N_P)$ is established provided the function value f(n) of the discrete component to the left [f(LB–1)] of the Left Boundary [LB] is greater than the function value of the Left Boundary f[LB], or f([LB–1])>f([LB]) when (n) is in (LB, $N_P$).

Similarly, the Right Boundary [RB] of each peak $(N_P)$ is established by analyzing the function values f(n) of the discrete components adjacent to and to the right of the peak $(N_P)$ within the closed discrete function Cf(n). The Right Boundary [RB] of each peak $(N_P)$ is established when the function value f(n) of the next subsequent discrete component (n), proceeding rightward from the peak $(N_P)$, exceeds the function value f(n) of the preceding discrete component (n). Therefore, the Right Boundary [RB] of the peak $(N_P)$ is established provided the function value f(n) of the discrete component to the right [(RB–1)] of the Right Boundary [RB] is greater than the function value of the Right Boundary [RB], or f([RB+1])>f([RB]) when (n) is in ($N_P$, RB).

The height (h) of a peak $(N_P)$ is determined by taking the minimum value of either (1) [{function value of the peak $f(N_P)$}–{function value of the Left Boundary f([LB])}] or (2) [{function value of the peak $f(N_P)$}–{function value of the Right Boundary f([RB])}], or expressed alternately, min $\{f(N_P)-f([LB]), f(N_P)-f([RB])\}$.

The associated height value (h) for the first peak $(N_{P1})$ contained in the peak stack is compared against a definable threshold value (T) by comparison code 708. The definable threshold value (T) may be selected in accordance with a users preference or in accordance with the requirements of a desired operational application.

Accordingly, provided the associated height value (h) of the first peak $(N_{P1})$ is greater than or equal to the definable threshold value (T), the first peak $(N_{P1})$ is classified as an actual peak (i.e., valid peak) and retained within the closed discrete function Cf(n) as an actual peak by comparison code 708. As such, each peak $(N_P)$ classified as an actual peak $(N_P)$ is maintained within the closed discrete function Cf(n).

Alternately, provided the associated height value (h) of the first peak $(N_{P1})$ is less than the definable threshold value (T), the peak $(N_{P1})$ would be classified as a non-peak. Accordingly, the discrete components (n) located between the respective peak boundaries (Left Boundary [LB] and Right Boundary [RB]) are assigned a constant value by comparison code 708 based upon respective peak boundaries (Left Boundary [LB] and Right Boundary [RB]) associated with the non-peak. Therefore, the discrete components (n) located between the respective peak boundaries (Left Boundary [LB] and Right Boundary [RB]) are assigned the minimum function value associated with the boundaries (Left Boundary [LB] and Right Boundary [RB]), wherein the non-peak is located between the respective Left Boundary [LB] and Right Boundary [RB], or expressed alternately, the discrete components (n) located between the respective peak boundaries are assigned to the min {f([LB]), f([RB])}, wherein non-peak ($N_{P1}$) is in [LB, RB]. Therefore, the non-peaks are effectively removed from the closed discrete function Cf(n) by setting the discrete components (n) located between the respective peak boundaries to a constant value determined by the minimum function value f(n), min {f([LB]), f([RB])}, associated with the respective peak boundaries (Left Boundary [LB] and Right Boundary [RB]) associated with a particular peak ($N_{Px}$).

Accordingly, after the first peak ($N_{P1}$) has been fully processed by comparison code 708, as illustrated above, the process returns to process the second peak ($N_{P2}$) contained in the peak stack. Similarly, the height of the second peak ($N_{P2}$) is determined by the determination code 706. Correspondingly, the second peak ($N_{P2}$) has as a greater function value or magnitude f($N_{P2}$) as compared to the function value of the previously processed peak ($N_{P1}$). Accordingly, the associated height value (h) for the second peak ($N_{P2}$) contained in the peak list is compared against a definable threshold value (T) by comparison code 708.

Correspondingly, provided the associated height value (h) of the second peak ($N_{P2}$) is greater than or equal to the definable threshold value (T), the second peak ($N_{P2}$) is classified as an actual peak (i.e., valid peak) and retained within the closed discrete function Cf(n) as an actual peak by comparison code 708. As such, each peak ($N_P$) classified as an actual peak ($N_P$) is maintained within the closed discrete function Cf(n).

Alternately, provided the associated height value (h) of the second peak ($N_{P2}$) is less than the definable threshold value (T), the peak ($N_{P2}$) would be classified as a non-peak. Accordingly, the discrete components (n) located between the respective peak boundaries (Left Boundary [LB] and Right Boundary [RB]) are assigned a constant value by comparison code 708 based upon respective peak boundaries (Left Boundary [LB] and Right Boundary [RB]) associated with the non-peak. Therefore, the discrete components (n) located between the respective peak boundaries (Left Boundary [LB] and Right Boundary [RB]) are assigned the minimum function value associated with the boundaries (Left Boundary [LB] and Right Boundary [RB]), wherein the non-peak is located between the respective Left Boundary [LB] and Right Boundary [RB], or expressed alternately, the discrete components (n) located between the respective peak boundaries are assigned to the min {f([LB]), f([RB])}, wherein non-peak ($N_{P1}$) is in [LB, RB]. Therefore, the non-peaks are effectively removed from the closed discrete function Cf(n) by setting the discrete components (n) located between the respective peak boundaries to a constant value determined by the minimum function value f(n), min {f([LB]), f([RB])}, associated with the respective peak boundaries (Left Boundary [LB] and Right Boundary [RB]) associated with a particular peak ($N_{Px}$).

Accordingly, this process is carried out for each peak ($N_{Px}$) contained in the peak stack until all the peaks ($N_{P1}$, $N_{P2}$, ..., $N_{Px-1}$, $N_{Px}$) contained in the peak stack have been processed. Therefore, each peak ($N_{Px}$) contained in the peak stack is processed in individual succession, so that each peak ($N_{Px}$) is fully processed before proceeding onto the next subsequent peak ($N_{Px}$) in the peak stack. As such, the first peak (e.g., $N_{P1}$) in the peak stack is fully processed before proceeding to process the next subsequent peak (e.g., $N_{P2}$) in the peak stack. This process is carried out for each peak ($N_{Px}$) contained in the peak stack until all the peaks ($N_{P1}$, $N_{P2}$, ..., $N_{Px-1}$, $N_{Px}$) contained in the peak stack have been processed.

As a result of the threshold comparisons and assignments, the actual peaks are retained within the closed discrete function Cf(n) and the non-peaks are effectively removed from the closed function, resulting in the generation of the final discrete function Ff(n). As such, peaks ($N_{Px}$) satisfying the definable threshold value (T) (i.e., height value (h) for a peak ($N_{Px}$)≧T) are maintained in the closed discrete function Cf(n), and peaks ($N_{Px}$) not satisfying the definable threshold value (T) (i.e., height value (h) for a peak ($N_{Px}$)<T) are effectively removed from the closed discrete function Cf(n), resulting in the generation of the final discrete function Ff(n).

Therefore, the actual peaks contained in the closed discrete function Cf(n), after processing all the peaks ($N_{Px}$) in the peak stack, are the valid or actual peaks of the original discrete function f(n).

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of determining peaks in a discrete function, the method comprising the steps of:

applying a closing function to the discrete function to generate a closed discrete function;

defining peaks within the closed discrete function, each of said peaks having an associated function value;

sorting the defined peaks according to its associated function value; and applying a threshold value to each sorted defined peak in individual succession, wherein sorted defined peaks having a peak height value above a threshold value are retained within the closed discrete function.

2. The method of claim 1, wherein the step of applying a closing function comprises:

applying a closing template to the discrete function;

applying a dilation function to the discrete function producing a dilated discrete function;

applying an erosion function to the dilated discrete function producing the closed discrete function.

3. The method of claim 2, wherein the step of applying a closing template to the discrete function further comprises:

selecting a template range to be applied to the discrete function by the closing template.

4. The method of claim 2, wherein the step of applying a dilation function to the discrete function comprises:

for each primary discrete component within the closing template;

determining a maximum discrete component function value from the discrete components contained within the closing template; and assigning the maximum discrete component function value to the primary discrete component.

5. The method of claim 2, wherein the step of applying an erosion function to the dilated discrete function comprises:

for each primary discrete component within the closing template;

determining a minimum discrete component function value from the discrete components contained within the closing template; and assigning the minimum discrete component function value to the primary discrete component.

6. The method of claim 1, wherein the step of defining peaks within the closed discrete function is based upon function values associated with discrete components adjacent each discrete component in the closed discrete function.

7. The method of claim 1, wherein the step of sorting the defined peaks according to function value comprises:

determining the function value for each defined peak; and sorting the defined peaks into a peak stack, wherein the defined peaks are stored in the peak stack in ascending function value order beginning with the smallest function value at the beginning of the peak stack.

8. The method of claim 1, further including the step of defining outer peak boundaries for each of the sorted defined peaks.

9. The method of claim 8, wherein the step of defining the outer peak boundaries for each of the sorted defined peaks comprises:

determining a left outer peak boundary based upon the function values of discrete components to the left of each sorted defined peak; and determining a right outer peak boundary based upon the function values of discrete components to the right of each sorted defined peak.

10. The method of claim 8, further including the step of determining the peak height value for each sorted defined peaks based upon the function value associated with each sorted defined peak and function values associated with the outer peak boundaries.

11. The method of claim 10, wherein each sorted defined peak is classified as an actual peak provided the peak height value of the defined peak exceeds or equals the threshold value.

12. The method of claim 11, wherein each actual peak is retained in the closed discrete function.

13. The method of claim 10, wherein each sorted defined peak is classified as a non-peak provided the peak height value is less than the threshold value.

14. The method of claim 13, wherein discrete components located between the respective outer peak boundaries associated with the non-peak are assigned a constant value.

15. The method of claim 14, wherein the constant value is the minimum function value associated with the respective outer peak boundaries.

16. A computer readable medium containing executable instructions which, when executed in a processing system, causes the processing system to perform the steps of a method for determining peaks in a discrete function, the method comprising:

applying a closing function to the discrete function to generate a closed discrete function;

defining peaks within the closed discrete function, each of said peaks having an associated function value;

sorting the defined peaks according to its associated function value; and applying a threshold value to each sorted defined peak in individual succession, wherein sorted defined peaks having a peak height value above a threshold value are retained within the closed discrete function.

17. The computer readable medium of claim 16, wherein the step of applying a closing function comprises:

applying a closing template to the discrete function;

applying a dilation function to the discrete function producing a dilated discrete function;

applying an erosion function to the dilated discrete function producing the closed discrete function.

18. The computer readable medium of claim 17, wherein the step of applying a closing template to the discrete function further comprises:

selecting a template range to be applied to the discrete function by the closing template.

19. The computer readable medium of claim 17, wherein the step of applying a dilation function to the discrete function comprises:

for each primary discrete component within the closing template;

determining a maximum discrete component function value from the discrete components contained within the closing template; and assigning the maximum discrete component function value to the primary discrete component.

20. The computer readable medium of claim 17, wherein the step of applying an erosion function to the dilated discrete function comprises:

for each primary discrete component within the closing template;

determining a minimum discrete component function value from the discrete components contained within the closing template; and assigning the minimum discrete component function value to the primary discrete component.

21. The computer readable medium of claim 16, wherein the step of defining peaks within the closed discrete function is based upon function values associated with discrete components adjacent each discrete component in the closed discrete function.

22. The computer readable medium of claim 16, wherein the step of sorting the defined peaks according to function value comprises:

determining the function value for each defined peak; and sorting the defined peaks into a peak stack, wherein the defined peaks are stored in the peak stack in ascending function value order beginning with the smallest function value at the beginning of the peak stack.

23. The computer readable medium of claim 16, further including the step of defining outer peak boundaries for each of the sorted defined peaks.

24. The computer readable medium of claim 23, wherein the step of defining the outer peak boundaries for each of the sorted defined peaks comprises:

determining a left outer peak boundary based upon the function values of discrete components to the left of each sorted defined peak; and determining a right outer peak boundary based upon the function values of discrete components to the right of each sorted defined peak.

25. The computer readable medium of claim 23, further including the step of determining the peak height value for each sorted defined peaks based upon the function value associated with each sorted defined peak and function values associated with the outer peak boundaries.

26. The computer readable medium of claim 25, wherein each sorted defined peak is classified as an actual peak provided the peak height value of the defined peak exceeds or equals the threshold value.

27. The computer readable medium of claim 26, wherein each actual peak is retained in the closed discrete function.

28. The computer readable medium of claim 25, wherein each sorted defined peak is classified as a non-peak provided the peak height value is less than the threshold value.

29. The computer readable medium of claim 28, wherein discrete components located between the respective outer peak boundaries associated with the non-peak are assigned a constant value.

30. The computer readable medium of claim 29, wherein the constant value is the minimum function value associated with the respective outer peak boundaries.

* * * * *